UNITED STATES PATENT OFFICE.

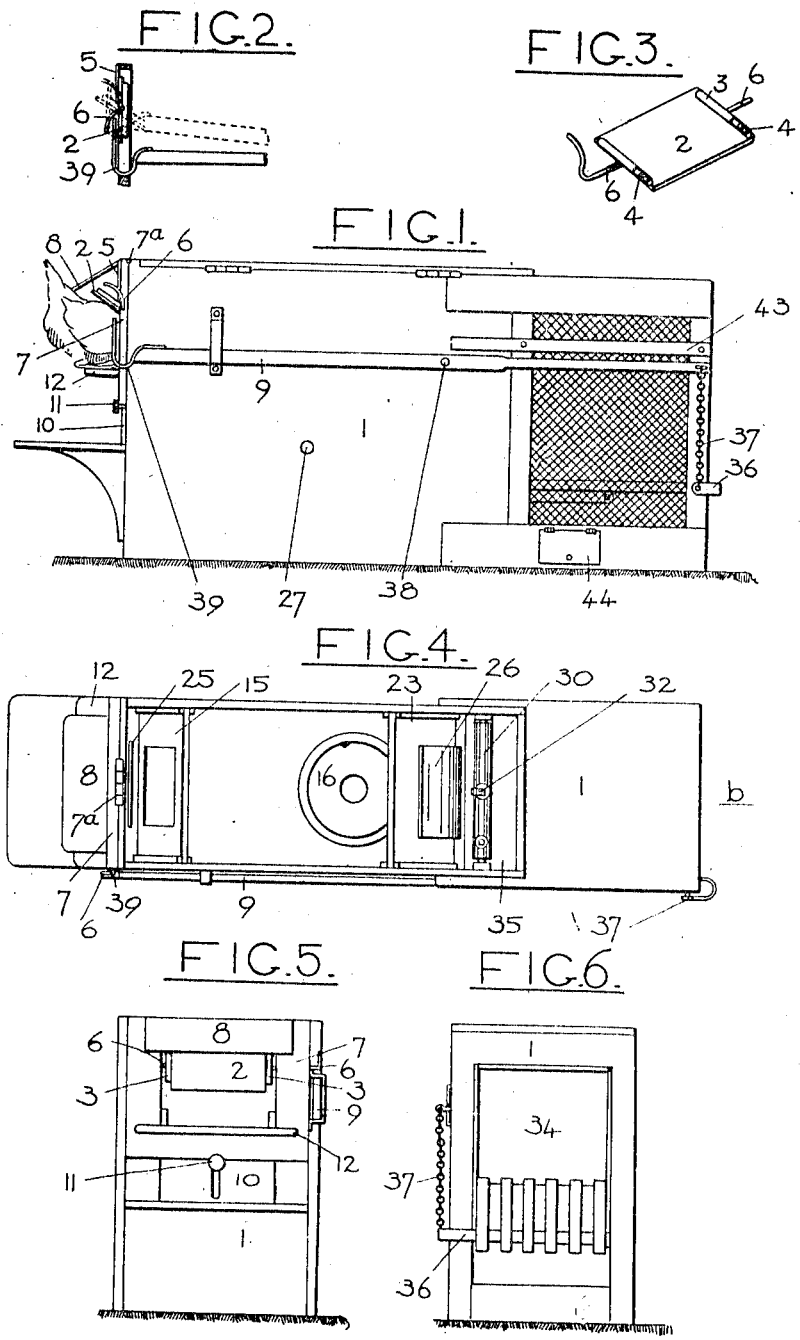

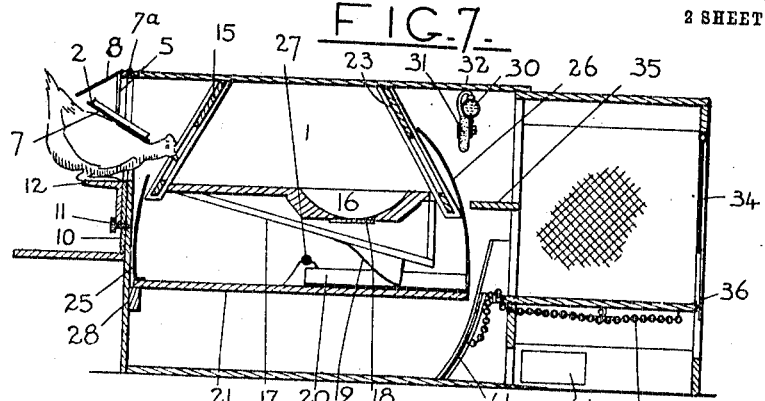
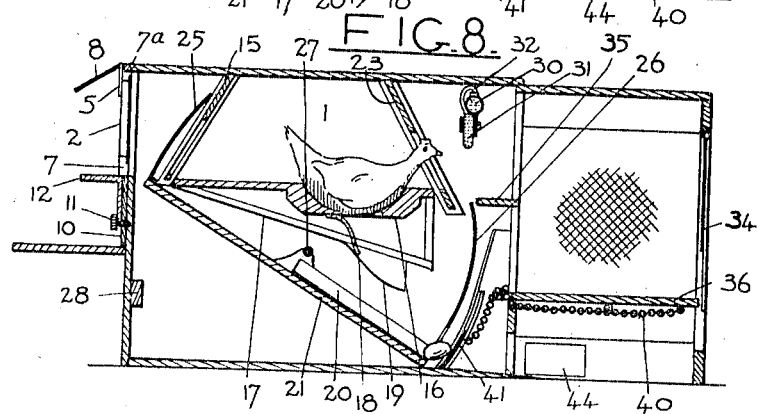
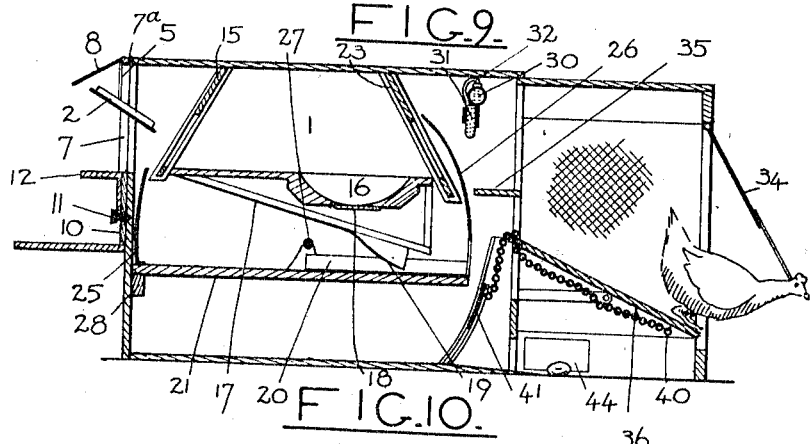
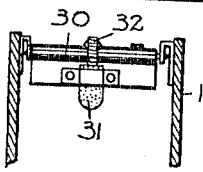

GEORGE HENERY CHAPMAN, OF HARRISTOWN, NEAR PORT PIRIE, SOUTH AUSTRALIA, AUSTRALIA.

TRAP-NEST FOR POULTRY.

1,105,403.  Specification of Letters Patent.  Patented July 28, 1914.

Application filed September 20, 1913. Serial No. 790,89*.

*To all whom it may concern:*

Be it known that I, GEORGE HENERY CHAPMAN, a subject of the King of Great Britain and Ireland, and residing at Lilly street, Harristown, near Port Pirie, State of South Australia, Commonwealth of Australia, have invented a certain new and useful Improved Trap-Nest for Poultry, of which the following is a specification.

My invention relates to an automatic trap nest for poultry the object of the same being to provide means whereby a laying hen will be isolated while laying, will be automatically marked as it leaves the nest, and will automatically reset the working parts of the nest when passing out of the same.

The essential features of my invention comprise a rectangular box-like structure having independent inlet and outlet doors in the ends, a nest proper, internal inlet and outlet closing plates carried upon the two ends of a rocking beam pivoted beneath the nest proper and operated by the egg, a slidable door adjacent to the outlet end of the rocking beam operated by a pivoted platform in the rear part of the box, a resetting lever for resetting the inlet door also operated by the pivoted platform, and a pivotally mounted marking device which marks the hen as she passes from the nest.

In order that my invention may be clearly understood I will describe the same with reference to the accompanying drawings in which—

Figure 1 is a side view of my trap nest complete. Fig. 2 is a detail view showing a portion of resetting lever and inlet door, the full lines showing the door closed and the lever in normal position, the dotted lines showing the lever opening the door. Fig. 3 is a perspective view of the inlet door showing the weighted tubes in partial section. Fig. 4 is a plan of my trap nest complete but with the hinged lid removed. Fig. 5 is a front view of same. Fig. 6 is a back view of same. Figs. 7, 8 and 9 are longitudinal sections on line *a b* of Fig. 4. Fig. 7 shows the position of the parts as the hen enters the nest. Fig. 8 shows them after the hen has laid an egg. Fig. 9 shows them as the hen is leaving the nest. Fig. 10 is a cross sectional detail view showing the marking device.

The frame 1 of my trap nest in appearance is a rectangular box-like structure. In the front end of the same and near the top is an opening in which is mounted an inlet door 2 pivoted at about its center upon horizontal trunnions 6. The door carries a tube or tubes 3 placed at right angles to its trunnions and containing a movable weight 4 such as mercury or a marble or marbles, the door being so balanced upon its trunnions that it will naturally hang against a stop 5 in the position shown in Fig. 7, or when tilted the movable weight will cause it to overbalance and hang in the position shown in Fig. 8. When closed the stop 5 engages the top of the door and prevents the door from being opened by a hen from the outside, but it may be opened by a hen from inside if she has not laid. The trunnion 6 of the door 2 extends outward beyond the side of the nest and is cranked or bent so as to be engaged by a pivoted resetting lever 9 on the side of the nest as hereafter described.

The inlet opening is made in, and the pivoted door is hung to, a frame 7 which is hinged to the structure at the top, and can be raised so as to give access to the interior. This frame 7 carries also a hood 8 which projects outward and covers the projecting edge of the pivoted door 2 (when open) preventing the door from being closed from above by a hen.

The effective size of the opening to the nest is made adjustable for different sized hens by means of a vertically slidable plate 10 at the bottom which moves within grooves or guides in the main structure and is fastened by a holding screw or catch 11. This plate carries a narrow shelf or platform 12 from which the hen opens the pivoted door. Opposite this door is a cross partition 15 in which is an opening through which the hen gains access to the nest proper 16 in the middle of the structure. This partition is preferably carried in grooves in the main structure and is set at a slope or formed with a curve to allow for the radial movement of a closing plate 25 the operation of which is hereafter explained.

The nest proper 16 is arranged over a sloping tray 17, and is lined with cloth or other suitable material, having in the center a hole of sufficient size to permit the escape of the egg. This hole is closed by a flap 18 of light material attached by a spring hinge or hinges which normally keep the flap closed, and beneath the flap is a guide 19 of canvas or other flexible material forming the bottom of the tray which leads the egg into a trough 20 upon the rocking beam 21 which carries the closing plate 25 previously mentioned. The tray carrying the nest proper is so made and supported upon ledges that it can be lifted out when desired for cleaning and other purposes. Immediately beyond the nest is a second partition 23 which is set at a slope or curve similarly to the partition 15, and behind this partition is a closing plate 26 substantially similar to the closing plate 25 above mentioned, except that it is normally in an elevated position closing an exit opening in the partition 23.

The mounting and operation of the closing plates 25 and 26 is as follows: Below and at the two sides of the nest 16 are two bearings which carry a horizontal shaft or axle 27 upon which a rocking beam 21 is hung, the closing plates 25 and 26 being carried upon the ends of such beam. Upon the top of the beam is the trough 20 extending from the axle to the exit end of the beam. An opening is provided at the bottom of the outlet closing plate 26 adjacent to the end of the egg trough 20 to allow an egg to pass off the trough. As previously indicated the normal position of the rocking beam 21 is such that the closing plate 26 at the exit end is in a position to block the opening in the partition 23 as shown in Figs. 7 and 9, the inlet end of the beam resting upon a stop 28. When an egg has passed through the hole in the nest 16 and run down the guide 19 into the trough 20 the weight thus added automatically rocks the beam and causes the exit end with the plate 26 to be depressed so as to clear the opening in the exit end cross partition 23, and simultaneously to block the opening in the entrance end cross partition 15.

Immediately behind the partition 23 is a pivotally mounted marking device comprising a reservoir carrying a supply of marking material of either liquid or powder nature, and a brush or pad arranged so that, as the hen passes beneath it, it is marked by a streak of the marking medium. Preferably this marking device comprises a cross tube 30 containing a liquid, and a pad 31 containing a powder with a wick 32 to convey the liquid to the pad and keep the pad moist. At the exit end of the nest is a hinged hanging door 34 capable of opening downward only and portions of the sides adjacent thereto are constructed of wire netting, battens or other means for admitting light in the vicinity of the exit door.

Beneath the marking device is a small fixed platform 35 and between this and the exit door 34 is a pivoted platform 36 connected by a chain 37 to the resetting lever 9 which is pivoted at 38 to the side of the structure. This resetting lever 9 terminates in a curved operating plate 39 which strikes the cranked end of the trunnion 6 of the pivoted entrance door and sets it in open position for the admission of another hen. To prevent the operation of the lever 9 by a hen outside the nest a shield 43 is attached to the side of the nest just above the rear portion of the lever. The pivoted platform 36 is also connected by a chain 40 to a small vertically slidable door 41 adjacent to the end of the trough 20 which door, so long as it remains closed, holds the egg upon the end of the trough and so holds the rocking beam 21 in the position shown in Fig. 8 permitting the hen to leave the nest by the exit door only. A small door 44 is provided in the side of the nest through which the eggs can be removed. The top of the appliance is provided with a suitably hinged lid to give access for cleaning and other purposes.

The operation of my trap nest is as follows: The normal position of the parts prior to the entrance of the hen is as shown in Figs. 1 and 7. The hen enters the nest from the platform 12 and in doing so she lifts the inwardly projecting edge of the balanced inlet door 2 thereby causing the movable weight 4 to run to the outwardly projecting edge of the door and overbalance the same causing it to swing into the position shown in Fig. 8 and closing the entrance so that no other hen can enter the nest while the first one is in it. Immediately the hen passes through the outer door 2 she passes through the opening in the cross partition 15 and to the nest proper 16 her farther advance being prevented by the cross partition 23 and closing plate 26. If the hen does not wish to lay she can leave the nest by the way she entered, pushing the outer door open from inside. So soon as she has laid an egg the egg escapes through the flap 18 in the bottom of the nest 16 and rolls down the guide 19 on to the trough 20 and rocks the beam 21 with the closing plates 25 and 26 into the position shown in Fig. 8. This movement of the plates enables the hen to pass through the partition 23 toward the exit end of the nest and to which it is attracted by reason of the light which gains access thereto through the open sides. As she passes through the partition 23 on to the small platform 35 under the marking device she receives a mark upon her back so that she can be identified among the hens in the yard as having laid. From the fixed platform 35 she passes on to the pivoted platform 36 and thence through the external swinging outlet door 34 at the rear of the nest. The tilting of the pivoted platform 36 as the hen passes over it raises the sliding door 41 as shown in Fig. 9 and permits the egg to roll off the end of the trough 20 into the chamber beneath the pivoted platform. As soon as the trough is freed from the weight of the egg it automatically swings back into the position shown in Figs. 7 and 9 thus opening the inlet cross partition 15 and closing the exit cross partition 23. The tilting of the pivoted platform also, through the chain 37, operates the resetting lever 9 which strikes the crank 6 of the pivoted inlet door 2 and resets that for the admission of another hen.

Having now fully described and ascertained my said invention and the manner in which it is to be performed I declare that what I claim is—

1. An improved trap nest for poultry comprising a rectangular box-like structure, independent inlet and outlet doors in the ends of same, a nest proper having a hole in its bottom, a rocking beam pivoted beneath the nest proper adapted to be operated by the egg and carrying upon its two ends two closing plates adapted to close inlet and outlet openings in two cross partitions, a slidable door adjacent to the outlet end of the rocking beam when in its lower position operated by a pivoted platform in the rear part of the box, a resetting lever pivoted to the side of the box also operated by the pivoted platform, and a pivotally mounted marking device, all substantially as described.

2. In a trap nest for poultry, an inlet door pivoted upon horizontal trunnions and carrying a tube or tubes placed at right angles to such trunnions and containing a movable weight, the door being so balanced upon its trunnions that it will be held in either open or closed position against a stop as required, in combination with a stationary projecting hood over the door which prevents the door being closed by a hen from outside, substantially as described.

3. In a trap nest for poultry, an inlet door pivoted upon horizontal trunnions and carrying a tube or tubes placed at right angles to the trunnions and containing a movable weight, the door being so balanced upon its trunnions that it will be held in either open or closed position against a stop as required, in combination with a vertically slidable plate below the door held by a suitable screw or catch whereby the size of the opening may be adjusted, substantially as described.

4. In a trap nest for poultry, a casing, inlet and outlet partitions within the casing and arranged respectively in front of and behind the nest proper such partitions having holes through which the hen may pass, in combination with two plates for closing such holes, and a rocking beam pivoted below the nest proper and adapted to be operated by the egg and to the ends of which the said plates are fixedly secured, substantially as described.

5. In a trap nest for poultry, a nest proper having in the center a hole of sufficient size to permit the escape of the egg and beneath the hole a flap attached by spring hinges and beneath the flap a guide of canvas or other flexible material all arranged above a rocking beam carrying two plates upon its two ends adapted to regulate admission to and exit from the nest and carrying a trough upon one end adapted to receive the egg from the nest and be operated thereby, in combination with a vertically slidable door adjacent to the end of such trough and adapted to hold the egg thereon or to release the same when operated by a pivoted platform and suitable connections, substantially as described.

6. In a trap nest for poultry, a casing, an inlet door pivoted to the casing on trunnions, one of which is provided with a crank arm, a pivoted platform adapted to be operated by the hen on leaving the casing, a resetting lever pivoted intermediate of its ends to the casing and having a free end adapted to engage the crank arm of the door, and a flexible connection between the platform and the other end of the lever.

7. In a trap nest for poultry, a nest proper situated at about the center thereof, two closing plates one in front of and one behind the nest proper carried by a rocking beam pivoted below the nest proper and adapted to close the entrance to and the exit from the nest, a pivoted door at the front of the nest which allows of the entrance of one hen only and permits its escape if it does not lay, and a door at the exit end which permits of the exit only of the hen, substantially as described.

8. In a trap nest for poultry, a pivoted marking device comprising a reservoir carrying a supply of marking material and a brush or pad whereby the marking material is applied to the hen as she leaves the nest after laying, substantially as described.

9. In a trap nest for poultry, an inclosing structure, a nest proper within said structure, closures adjacent to the front and back of the nest proper, a rocking element carrying said closures, the nest proper having an escape outlet for an egg above said rocking element, a receiving chamber for an egg, a closure at the entrance of said chamber, an outlet from the inclosing structure, a rocking platform between the nest proper and the last mentioned outlet, and operative connections between the said platform and the closure of the receiving chamber.

10. In a trap nest for poultry, a casing, a nest having an outlet opening therein, a closure commanding said opening, an egg receiving trough, and means for retaining the egg in the trough and means controlled by the hen leaving the casing for controlling the retaining device.

11. In a trap nest for poultry, a casing, a nest having an outlet opening therein, means for commanding said opening, an egg receiving trough having an opening for the escape of the egg therefrom, a closure for said opening, and a movable platform operatively connected with the said closure.

12. In a trap nest for poultry, a casing, a nest having an outlet opening therein, means for commanding said opening, an egg receiving trough having an opening for the escape of the egg therefrom, a sliding door for said opening, a tilting platform, and a flexible connection between the platform and door.

13. In a trap nest for poultry, a casing, and a pivoted marking device arranged at the outlet side of the casing, said marking device comprising a tube adapted to contain a liquid, a pad adapted to contain a powder, and a wick for conveying the liquid to the pad.

In testimony that I claim the foregoing as my invention I have signed my name in the presence of two subscribing witnesses this sixth day of August 1913.

GEORGE HENERY CHAPMAN.

Witnesses:
ARTHUR GORE COLLISON,
PERCIVAL CLAUDE MANUEL.